United States Patent

[11] 3,622,631

[72] Inventor William F. Johns
  Glenview, Ill.
[21] Appl. No. 724,249
[22] Filed Apr. 25, 1968
[45] Patented Nov. 23, 1971
[73] Assignee G. D. Searle & Co.
  Chicago, Ill.
  Continuation-in-part of application Ser. No. 545,582, Apr. 27, 1966, now abandoned. This application Apr. 25, 1968, Ser. No. 724,249

[54] 17β-HYDROXY-10,17αβ-DIMETHYL-D-HOMO-C-NOR-13α-GON-4-EN-3-ONE AND CONGENERS
  18 Claims, No Drawings
[52] U.S. Cl. .................................................. 260/586 H,
  260/476 C, 260/488 B, 260/999
[51] Int. Cl. ............................................................ C07c 49/30,
  C07c 49/48
[50] Field of Search ............................................... 260/586 H,
  476 C, 488 B

[56] References Cited
UNITED STATES PATENTS
3,361,791 1/1968 Johns et al. ........................ 260/476
OTHER REFERENCES
Johns et al., J. Org. Chem., Vol. 30, pp. 123– 131 (1965)
Kupchan et al., J. Am. Chem. Soc., Vol. 86, pp. 701– 708 (1964)

*Primary Examiner*—Bernard Helfin
*Assistant Examiner*—Gerald A. Schwartz
*Attorneys*—John M. Brown, John J. Kolano, Elliott N. Schubert, Walter C. Ramm and Helmuth A. Wegner ABSTRACT: Preparation of 17β-hydroxy-10,17αβ-dimethyl-D-homo-C-nor-13α-gon-4-en-3-one and congeners, and their capacity to block the effect of DCA on urinary sodium and potassium, are disclosed.

17β-HYDROXY-10,17αβ-DIMETHYL-D-HOMO-C-NOR-13α-GON-4-EN-3-ONE AND CONGENERS

The application for Letters Patent securing the invention herein described and claimed is a continuation-in-part of Applicant's prior copending application Ser. No. 545,582 filed Apr. 27, 1966, now abandoned.

This invention relates to 17β-hydroxy-10,17aβ-dimethyl-D-homo-C-nor-13α-gon-4-en-3-one and congeners, and to processes for the preparation thereof. More particularly, this invention provides new, useful, and unobvious chemical compounds of the formula

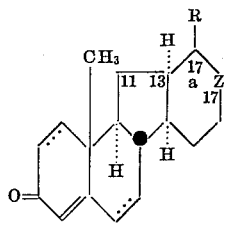

I wherein R represents hydrogen or an alkyl radical; Z represents a carbonyl or oxymethylene radical of the formulas

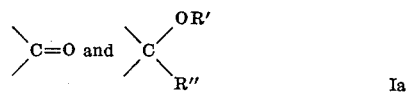

Ia respectively, in which R' represents hydrogen or an acyl radical and R" represents hydrogen or an alkyl or alkynyl radical; and the endocyclic dotted lines designate the location of an optional double bond in either, but not both, of rings A and B.

The alkyl radicals called for in the foregoing formulas are preferable of lower order, i.e., methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings of empirical formula $$-C_nH_{2n+1}$$

wherein $n$ is a positive integer less than 8. An especially preferred embodiment of R is methyl.

The alkynyl radicals contemplated by R" are likewise most desirably of lower order, i.e., groupings which can be thought of as derived from polycarbon lower alkyl radicals by displacement of hydrogen to give rise to a triple bond. Illustrative lower alkynyl radicals are ethynyl, 1-propynyl, 2-propynyl, 1-butynyl, 2-butynyl, 3-butynyl, and the like, among which ethynyl is especially preferred.

The acyl radicals embraced by R' are alkanoyl, benzoyl, and like art-recognized pharmacologically-acceptable esterifying moieties among which lower alkanoyl groupings —i.e., those having the formula

—alkyl

—and benzoyl are preferred.

The compounds to which this invention relates are distinguished from the prior art by reason of their 13 alpha hydrogen and 17a beta/nor alkyl structure, and the valuable and totally unforeshadowed pharmacological utility which characterizes them. Specifically—like the well-known diuretic, spironolactone—the claimed compounds block the effect of desoxycorticosterone acetate (DCA) on urinary sodium and potassium.

The surprising anti-DCA activity of the compounds of this invention is shown by standardized tests for the aforesaid property carried out substantially as described in Ser. No. 647,600 filed June 21, 1967, excepting that test compounds are administered subcutaneously instead of orally, and in sufficiently various dosage to enable determination of that does of each compound (the so-called median effective dose hereinafter abbreviated as MED) which produces a mean log Na×10/K value identical to that produced by 0.33 mg. of spironolactone. Results of such tests on representative compounds of the instant invention are tabulated below:

TABLE I

| Compound | Ex. | MED |
|---|---|---|
| 10,17aβ-dimethyl-D-homo-C-nor-13α-gona-1,4-diene-3,17-dione | 1 | 0.15 |
| 17β-hydroxy-10,17α,17aβ-trimethyl-D-homo-C-nor-13α-gona-1,4-dien-3-one | 4B | 0.27 |
| 17β-hydroxy-10,17α,17aβ-trimethyl-D-homo-C-nor-13α-gon-4-en-3-one | 5 | 0.98 |
| 17β-hydroxy-10,17aβ-dimethyl-D-homo-C-nor-13α-gona-1,4-dien-3-one | 9 | 0.32 |
| 17β-hydroxy-10,17aβ-dimethyl-D-homo-C-nor-13α-gon-4-en-3-one | 14 | 0.052 |
| 10,17aβ-dimethyl-D-homo-C-nor-13α-gon-4-ene-3,17-dione | 15 | 0.40 |
| 17β-hydroxy-10-methyl-D-homo-C-nor-13α-gon-4-ene-3,17-dione tetartoacetonate | 21 | 0.37 |

Various prior art and other more-or-less closely related compounds, when tested by the foregoing procedure, afforded results set forth in table II:

TABLE II

| Compound | MED |
|---|---|
| 17β-hydroxy-10,17aα-dimethyl-D-homo-C-nor-13α-gona-1,4-dien-3-one | >2.4 |
| 10,17aβ-dimethyl-D-homo-C-nor-5α,13α-gonane-3,17-dione | >2.4 |
| 17α-hydroxy-10,17β,17aα-trimethyl-D-homo-C-nor-13α-gon-4-en-3-one | >2.4 |
| 10,17aβ-dimethyl-D-homo-C-norgon-4-ene-3,17-dione | >2.4 |
| 10-methyl-D-homo-C-nor-5α,13α-D-homo-C-nor-5α,13α-gonan-3-one | >2.4 |
| 17α-hydroxy-10,17aβ-dimethyl-D-homo-C-nor-13α-gon-4-en-3-one | 1.05 |
| 17β-hydroxy-10,17aβ-dimethyl-D-homo-C-nor-gon-4-en-3-one tetartoacetonate | >2.4 |
| 17β-hydroxy-10,17aα-dimethyl-D-homo-C-nor-13α-gon-4-en-3-one | 1.9 |

Preparation, but no biological properties, of the asterisked compounds is disclosed in J. Org. Chem., 30, 123 (1965). Compounds which, at a maximum dose of 2.4 mg. failed to produce a mean log Na×10/K value equal to or greater than the value produced by 0.33 mg. of spironolactone may or may not have any anti-DCA activity; in either case, their potency was insufficient to warrant determination of MED's.

From the foregoing results it appears, i.a., that the 17aβ-methyl product of example 9 hereinafter blocked the urinary electrolyte effects of DCA at less than one-seventh the dose at which the prior art 17aβ-epimer did not. The 17aβ-methyl-13 α product of example 14 blocked DCA at less than one thirty-sixth the dose at which the 17aα-epimer produced a comparable block, and less than one forty-sixth the dose at which the 13β-epimer did not. And the Δ⁴ product of example 15 blocked DCA at one-sixth the dose at which the saturated A ring analog did not. Potency of the product of example 14, relative to the spironolactone standard, was 635 percent.

Compounds of the formula

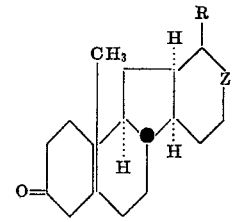

II wherein R and Z are defined as before can be prepared from the corresponding 3β-ols by oxidation with chromium trioxide in aqueous acetonic sulfuric acid (Jones' reagent). Upon heating with selenium dioxide in tert-butyl alcohol and pyridine, compounds of formula II afford the corresponding Δ¹,⁴ derivatives. The latter compounds, in turn, afford the Δ⁴ analogs on contacting in tetrahydrofuran solution with lithium and ammonium chloride in liquid ammonia. From the Δ⁴ compounds, on heating with chloranil in tert-butyl alcohol, the Δ⁴,⁶ derivatives are obtained.

As a preferred alternative to the foregoing reaction sequence, compounds of formula II and Δ¹,⁴, Δ⁴, and Δ⁴,⁶ derivatives thereof wherein a hydroxyl is present at carbon atom 17 are prepared from the corresponding 17-esters by saponification in hot aqueous methanolic potassium hydroxide.

An alternative preparation of 10,17aβ-dimethyl-D-homo-C-nor-13α-gona-1,4-diene-3,17-dione involves fermentation of 3β-acetoxy-10-methyl-D-homo-C-nor 5α,13α-gonan-17β-yl methyl ketone with the *Norcardia sp.* on deposit in the American Type Culture Collection under accession number 19534, freely available on request.

An alternative preparation of the Δ⁴-17-oxy compounds of formula II proceeds by contacting the corresponding 1,2,3,4-tetrahydro compounds with 2 equivalents of bromine in acetic acid catalyzed by hydrogen bromide. The 2α,4α-dibromo derivatives which eventuate are heated with iodoacetone in an acetonic medium containing sodium iodide to give the corresponding 2-iodo-4-en-3-ones. Iodine is then replaced by hydrogen in the latter compounds on contacting with zinc dust in acetic acid.

An alternative preparation of the Δ¹,⁴, Δ⁴, and Δ⁴,⁶-3,17-diones of formula II starts with the corresponding 17β-ols, which yield the diones on oxidation with Jones' reagent.

An alternative route to the Δ¹,⁴, Δ⁴, and Δ⁴,⁶ esters of formula II is the acylation of corresponding 17-ols by heating with an appropriate acid anhydride or halide in the presence of an acid acceptor such as pyridine.

The 3β-ols required for preparation of the compounds of formula II wherein Z represents β-alkanoyl-oxymethylene can be obtained by contacting an appropriate ketone of the formula

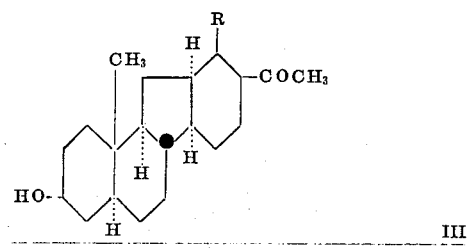

III wherein R is defined as before, with formic acid, inducing Baeyer-Villiger rearrangement in the resultant 3-formate by contacting with m-chloroperoxybenzoic acid, and selectively cleaving the ester linkage at carbon atom 3 of the 17β-alkanoyloxy-3β-formyloxy-10-methyl-D-homo-C-nor-5α,13α-gonane thus obtained by contacting with alkaline alumina.

The 3β-ols required for preparation of the compounds of formula II wherein Z represents β-alkanoyloxy-α-(alkyl/alkynyl) can be obtained by contacting an appropriate ketone of the formula

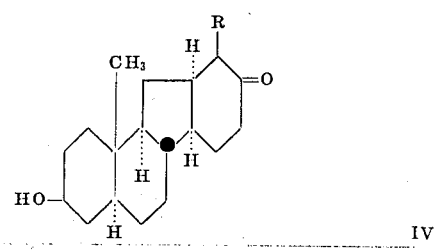

IV wherein R is defined as before, with an appropriate (alkyl/alkynyl) magnesium halide in ethereal tetrahydrofuran and then diluting with water.

The foregoing and other representative procedures for preparing compounds illustrative of the present invention are detailed in the following examples. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

10,17aβ-Dimethyl-D-homo-C-nor-13α-gona-1,4-diene-3,17-dione. A sterile nutrient bacteriological medium consisting of 600 parts of commercial beef extract, 1000 parts of commercial peptone, and 200,000 parts of distilled water is inoculated with 500 parts of a culture of *Nocardia sp.* A.T.C.C. no. 19534. The resultant mixture is incubated with agitation and aeration for 24 hours at approximately 25°, whereupon a solution of 137 parts of 3β-acetoxy-10,17aβ-dimethyl-D-homo-C-nor-5α,13α-gonan-17β-yl methyl ketone [J. Org. Chem., 30, 123 (1965)] in 3200 parts of acetone and 3200 parts of methanol is introduced. Incubation as before is thereupon resumed for 40 hours. The mixture thus obtained is extracted with dichloromethane. Solvent is removed from the extract by distillation; and the residue is chromatographed on silica gel, using benzene and ethyl acetate as developing solvents. From an eluate comprising 30 percent ethyl acetate in benzene, on evaporation of the solvent and recrystallization of the residue from a mixture of dichloromethane and hexane, 10,17aβ-dimethyl-D-homo-C-nor-13α-gona-1,4-diene-3,17-dione melting at 176–180° is obtained. The product has the formula

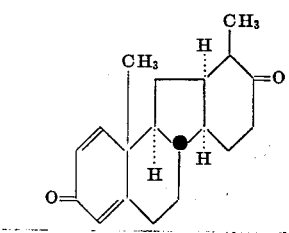

EXAMPLE 2

A. 10,17α,17aβ-Trimethyl-D-homo-C-nor-5α,13α-gonane-3β,17β-diol. To a solution of 357 parts of methyl-magnesium bromide in 4200 parts of ether is added a solution of 100 parts of 3β-hydroxy-10,17aβ-dimethyl-D-homo-C-nor-5α,13α-gonan-17-one [J. Org. Chem., 30, 123 (1965)] in 1800 parts of tetrahydrofuran. The resultant solution is stirred at room temperatures for 20 hours, whereupon it is diluted with 5 volumes of water followed by sufficient aqueous 5 percent hydrochloric acid to dissolve the salts. The resultant mixture is extracted with ether. The ether extract is consecutively washed with water, aqueous potassium bicarbonate, and water, then dried over magnesium sulfate and freed of solvent by vacuum distillation. The residue is 10,17α,17aβ-trimethyl-D-homo-C-nor-5α,13α-gonane-3β,17β-diol which, recrystallized from a mixture of acetone and hexane, melts at approximately 149–150°.

B. 3β,17β-Diacetoxy-10,17α,17aβ-trimethyl-D-homo-C-nor-5α,13α-gonane. To a solution of 10 parts of 10,17α,17aβ-trimethyl-D-homo-C-nor-5α,13α-gonane-3,17β-diol in a mixture of 200 parts of acetic anhydride and 1 of toluenesulfonic acid is stirred at room temperatures for 6 hours, then heated at 95° for 2 hours. The solution is then cooled and poured into 5 volumes of a mixture of equal parts of aqueous 5 percent sodium bicarbonate and ice. The resultant mixture is extracted with dichloromethane. The extract is washed with aqueous 5 percent potassium hydroxide and then stripped of solvents by vacuum distillation. The residue is chromatographed on silica gel, using benzene and ethyl acetate as developing solvents. From an eluate comprising 2 percent ethyl acetate in benzene, on evaporation of the solvents, 3β,17β-diacetoxy-10,17α,17aβ-trimethyl-D-homo-C-nor-5α,13α-gonane is obtained.

C. 17β-Acetoxy-10,17α,17aβ-trimethyl-D-homo-C-nor-5α,13α-gonan-3β-ol. To a solution of 1 part of 3β,17β-diacetoxy-10,17α,17aβ-trimethyl-D-homo-C-nor-5α,13α-gonane in 14 parts of methanol is added 2 parts of saturated aqueous potassium bicarbonate and 2 parts of water. The resultant mixture is heated at the boiling point for 2 hours, then cooled and extracted with dichloromethane. The extract is washed with water and stripped of solvent by vacuum distillation. The residue is chromatographed on silica gel, using benzene and ethyl acetate as developing solvents. From an eluate comprising 5 percent ethyl acetate, on evaporation of solvents, 17β-acetoxy-10,17α,17aβ-trimethyl-D-homo-C-nor-5α,13α-gonan-3β-ol is obtained.

D. 17β-Acetoxy-10,17α,17aβ-trimethyl-D-homo-C-nor-5α,13α-gonan-3-one. To a solution of 135 parts of 17β-acetoxy-10,17α,17aβ-trimethyl-D-homo-C-nor-5α,13α-gonan-3β-ol in 2400 parts of acetone at 5° is added 27 parts of chromium trioxide in a mixture of 39 parts of sulfuric acid and 150 parts of water. After 15 minutes, 3000 parts of water and 160 parts of 2-propanol are introduced. The resultant mixture is extracted with benzene; and the benzene extract is consecutively washed with water, aqueous 5 percent potassium bicarbonate, and water. The extract is then dried over magnesium sulfate and stripped of solvent by vacuum distillation. The residue is chromatographed on silica gel, using benzene and ethyl acetate as developing solvents. From an eluate comprising 3 percent ethyl acetate in benzene, on evaporation of solvents, 17β-acetoxy-10,17aβ-trimethyl-D-homo-C-nor-5α,13α-gonnan-3-one is obtained.

E. 17β-Acetoxy-10,17α,17aβ-trimethyl-D-homo-C-nor-13α-gona-1,4-dien-3-one. A mixture of 33 parts of 17β-acetoxy-10,17aβ-trimethyl-D-homo-C-nor-5α,13α-gona-3-one, 20 parts of selenium dioxide, 10 parts of pyridine, and 1200 parts of tert-butyl alcohol is heated at the boiling point under reflux in a nitrogen atmosphere for 65 hours. The resultant mixture is filtered, and the filtrate is extracted with ethyl acetate. The extract is consecutively washed with water, aqueous 10 percent potassium bicarbonate, water, ice-cold aqueous 10 percent ammonium sulfide, ice-cold 10 percent ammonium hydroxide, water, 5 percent potassium bicarbonate, whereupon solvent is removed by vacuum distillation and the residual oil chromatographed on silica gel, using benzene and ethyl acetate as developing solvents. From an eluate comprising 5 percent ethyl acetate in benzene, upon evaporation of the solvent and recrystallization of the residue from a mixture of acetone and hexane, 17β-acetoxy-10,17α,17aβ13α-gona-1,4-dien-3-one is obtained.

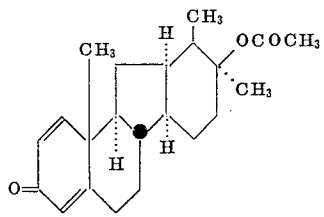

EXAMPLE 3

17β-Acetoxy-10,17α,17aβ-trimethyl-D-homo-C-nor-13α-gon-4-en-3-one. To a mixture of 630 parts of liquid ammonia at −70° with 3 parts of lithium is added 9 parts of 17β-acetoxy-10,17α,17aβ-trimethyl-D-homo-C-nor-13α-gona-1,4-dien-3-one in 180 parts of tetrahydrofuran, followed 5 minutes later by 200 parts of ammonium chloride. As soon as the blue color disappears, the ammonia is removed by distillation and the residue thereupon diluted with an equal volume of water. The resultant mixture is extracted with dichloromethane. The extract is washed with water and stripped of solvent by vacuum distillation. The residue is 17β-acetoxy-10,17α,17aβ-trimethyl-D-homo-C-nor-13α-gon-4-en-3-one, having the formula

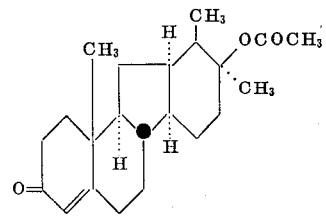

EXAMPLE 4

A. 17β-Hydroxy-10,17α,17aβ-trimethyl-D-homo-C-nor-5α,13α-gonan-3-one. To a solution of 135 parts of 10,17α,17aβ-trimethyl-D-homo-C-nor-5α,13α-gonane-3β,17β-diol in 2400 parts of acetone at 5° is added 27 parts of chromium trioxide in a mixture of 39 parts of sulfuric acid and 150 parts of water. After 15 minutes, 3000 parts of water and 160 parts of 2-propanol are introduced. The resultant mixture is extracted with ether. The ether extract is consecutively washed with water and aqueous 1 percent potassium bicarbonate, dried over magnesium sulfate, and stripped of solvent by vacuum distillation. The residue is recrystallized from a mixture of ether and hexane to give 17β-hydroxy-10,17α,17aβ-trimethyl-D-homo-C-nor-5α,13α-gonan-3-one melting at approximately 128–129°.

B. 17β-Hydroxy-10,17α,17aβ-trimethyl-D-homo-C-nor-13α-gona-1,4-dien-3-one. A mixture of 33 parts of 17β-hydroxy-10,17α, 17aβ-trimethyl-D-homo-C-nor-5α,13α-gonan-3-one and 20 parts of selenium dioxide in a mixture of 1200 parts of tert-butyl alcohol and 10 parts of pyridine is heated at the boiling point under reflux in a nitrogen atmosphere for 65 hours. The red precipitate which forms is filtered off at the termination of the heating period and washed with ethyl acetate. Filtrate and wash are then combined and concentrated to dryness by vacuum distillation. The residue is taken up in ethyl acetate. The ethyl acetate solution is consecutively washed with water, aqueous 10 percent potassium bicarbonate, water, ice-cold 10 percent ammonium sulfide, ice-cold 10 percent ammonium hydroxide, water, The product 5 percent hydrochloric acid, water, and aqueous 1 percent potassium bicarbonate. Solvent is then removed by vacuum distillation and the residue chromatographed on silica gel, using benzene and ethyl acetate as developing solvents. From an eluate comprising 20 percent ethyl acetate in benzene, on evaporation of solvent and recrystallization of the residue from a mixture of acetone and hexane, 17β-hydroxy-10,17α,17aβtrimethyl-D-homo-C-nor-13α-gona-1,4-dien-3-one melting at approximately 151–152° is obtained. The product has the formula

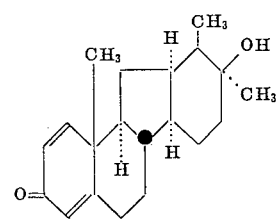

EXAMPLE 5

17β-hydroxy-10,17α,17aβ-trimethyl-D-homo-C-nor-13α-gon-4-en-3-one. Substitution of 630 parts of 17β-hydroxy-10,17α,17a-trimethyl-D-homo-C-nor-13α-gona-1,4-dien-3-one for the 17β-trimethyl-D-homo-C-nor-13α,17aβ-trimethyl-D-homo-C-nor-13α-gona-1,4-dien-3-one called for in example 3 affords, by the procedure there detailed, 17β-hydroxy-10,17α,17aβ13α-gon-4-en-3-one which,
recrystallized from hexane, melts at approximately 135–136°. The product has the formula

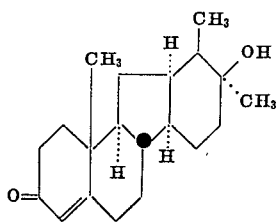

EXAMPLE 6

17β-Hydroxy-10,17α,17aβ-trimethyl-D-homo-C-nor-13α-gona-4,6-dien-3-one. To 60 parts of 17β-hydroxy-10,17α,17aβ13α-gon-4-en-3-one in 78 parts of tert-butyl alcohol is added 100 parts of chloranil. The resultant mixture is stirred at the boiling point under reflux in a nitrogen atmosphere for 5 hours. It is then cooled to room temperature and diluted with 5 volumes of water. The mixture thus obtained is extracted with dichloromethane. The extract is successively washed with aqueous 5 percent potassium hydroxide and water, whereupon solvent is removed by distillation and the residue chromatographed on silica gel, using benzene and ethyl acetate as The resultant solvents. From an eluate comprising 5 percent ethyl acetate in benzene, on evaporation of solvent, 17β-hydroxy-10,17α,17aβ-trimethyl-D-homo-C-nor-13α-gona-4,6-dien-3-one is obtained. The product has the formula

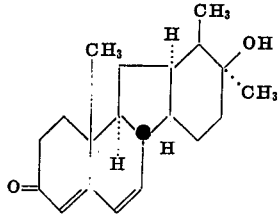

EXAMPLE 7

A. 17α-Ethynyl-10,17aβ-dimethyl-D-homo-C-nor-5α,13α-gonane-3β,17β-diol. To 360 parts of tetrahydrofuran containing 40 parts of ethynylmagnesium bromide prepared as described in Organic Synthesis, Coll. Vol. IV, page 792, is added, during 20 minutes at 5°, 2 parts of 3β-hydroxy-10,17aβ-dimethyl-D-homo-C-nor-5α,13α-gonan-17-one [J. Org. Chem., 30, 123 (1965)] in 45 parts of tetrahydrofuran. The resultant mixture is stirred at room temperatures for 2 hours, then poured into a solution of 20 parts of ammonium chloride in 1000 parts of water. The resultant mixture is extracted with ether, and the ether extract is washed with water and thereupon stripped of solvent by vacuum distillation. Recrystallization of the residue from a mixture of acetone and hexane affords 17α-ethynyl-10,17aβ-dimethyl-D-homo-C-nor-5α,13α-gonane-3β,17β-diol.

B. 17α-Ethynyl-17β-hydroxy-10,17aβ-dimethyl-D-homo-C-nor-5α,13α-gonan-3-one. To a solution of 135 parts of 17α-ethynyl-10,17aβ-dimethyl-D-homo-C-nor-5α,13α-gonane-3β,17β-diol in 2400 parts of acetone at 5° is added 27 parts of chromium trioxide in a mixture of 39 parts of sulfuric acid and 150 parts of water. After 5 minutes, 3000 parts of water and 160 parts of 2-propanol are introduced. The resultant mixture is extracted with benzene; and the benzene extract is consecutively washed with water, aqueous 5 percent potassium bicarbonate, and water. The extract is then dried over magnesium sulfate and stripped of solvent by vacuum distillation. Recrystallization of the residue from a mixture of acetone and hexane affords 17α-ethynyl-17β-hydroxy-10,17aβ-dimethyl-D-homo-C-nor-5α,13α-gonan-3-one melting at 176–178°.

C. 17α-Ethynyl-17β-hydroxy-10,17aβ-dimethyl-D-homo-C-nor-13α-gona-1,4-dien-3-one. A mixture of 33 parts of 17α-ethynyl-17β-hydroxy-10,17aβ-dimethyl-D-homo-C-nor-5α,13α-gonan-3-one and 20 parts of selenium dioxide in a mixture of 1200 parts of tert-butyl alcohol and 10 parts of pyridine is heated at the boiling point under reflux in a nitrogen atmosphere for 65 hours. The red precipitate which forms is thereupon filtered off and washed with ethyl acetate. Filtrate and wash are combined and stripped of solvent by vacuum distillation. The residue is taken up in ethyl acetate. The ethyl acetate solution is consecutively washed with water, aqueous 10 percent potassium bicarbonate, water, ice-cold aqueous 10 percent ammonium sulfide, ice-cold aqueous 10 percent ammonium hydroxide, water, 5 percent hydrochloric acid, water, and aqueous 1 percent potassium bicarbonate. Solvent is then removed by vacuum distillation and the residue chromatographed on silica gel, using benzene and ethyl acetate as developing solvents. From an eluate comprising 10 percent ethyl acetate in benzene, on evaporation of solvent and recrystallization of the residue from ether, 17α-ethynyl-17β-hydroxy-10,17aβ-dimethyl-D-homo-C-nor-13α-gona-1,4-dien-3-one is obtained as the hemi(diethyl etherate) melting at 181–183°. Solvent of crystallization is removed by heating in vacuo. The nonsolvated product has the formula

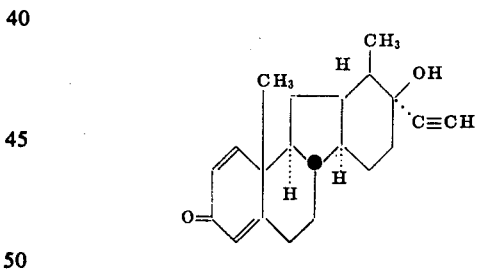

EXAMPLE 8

A. 3β-Formyloxy-10,17aβ-dimethyl-D-homo-C-nor-5α,13α-gonan-17β-yl methyl ketone. A solution of 26 parts of 3β-hydroxy-10,17aβ-dimethyl-D-homo-C-nor-5α,13α-gonan-17β-yl methyl ketone in 180 parts of 98 percent formic acid is allowed to stand at room temperatures for 1 hour, then diluted with 10 volumes of water. The precipitate thrown down is filtered off and recrystallized from aqueous acetone to give 3β-formyloxy-10,17aβ-dimethyl-D-homo-C-nor-5α,13α-gonan-17β-yl methyl ketone melting at 92–94°.

B 17β-Acetoxy-3β-formyloxy-10,17aβ-dimethyl-D-homo-C-nor-5α,13α-gonane A solution of 26 parts of 3β-formyloxy-10,17aβ-dimethyl-D-homo-C-nor-5α,13α-gonan-17-yl methyl ketone and 10 parts of m-chloroperoxybenzoic acid in 1070 parts of dichloromethane is allowed to stand at room temperatures for 1 week. Approximately 30 parts f calcium hydroxide is thereupon introduced and the resulting mixture then stirred for 30 minutes. Insoluble solids are filtered off and solvent removed from the filtrate by vacuum distillation. The residue is 17β-acetoxy-3β-formyloxy-10,17aβ-dimethyl-D-homo-C-nor-5α,13α-gonane C. 17β-Acetoxy-10,17aβ-dimethyl-D-homo-C-nor-5α,13α-gonan-3β-ol. A solution of approximately 26 parts of 17β- acetoxy-3β-formyloxy-10,17aβ-dimethyl-D-homo-C-nor-5α,13α-gonane in 440 parts of benzene is absorbed on 600 parts of alkaline alumina. Elution with a mixture of 50 percent ethyl acetate in benzene followed by removal of solvent from the eluate by vacuum distillation affords 17β-acetoxy-10,17 aβ-dimethyl-D-homo-C-nor-5α,13α-gonan-3β-ol which, recrystallized from a mixture of acetone and hexane, melts at 91–93°<·

D. 17β-Acetoxy-10,17aβ-dimethyl-D-homo-C-nor-5α,13α-gonan-3-one. To a solution of 135 parts of 17β-acetoxy-,-17aβ-dimethyl-D-homo-C-nor-5α,13α-gonan-3β-ol in 2400 parts of acetone at 5 ° is added 27 parts of chromium trioxide in a mixture of 39 parts of sulfuric acid and 150 parts of water. After 15 minutes, 3000parts of water and 160 parts of 2-propanol are introduced. The resulting mixture is extracted with dichloromethane; and the extract is consecutively washed with water, aqueous potassium bicarbonate, and water. The extract is then dried over magnesium sulfate and stripped of solvent by vacuum distillation. The residue is chromatographed on silica gel, using benzene and ethyl acetate as developing solvents. From an eluate comprising 10 percent ethyl acetate in benzene, on evaporation of solvent, amorphous 17β-acetoxy-10,17aβ-dimethyl-D-homo-C-nor-5α,13α-gonan-3-one is obtained as the residue.

E. 17β-Acetoxy-10,17aβ-dimethyl-D-homo-C-nor-13α-gona-1,4-dien-3-one. Substitution of 33 parts of 17β-acetoxy-10,17aβ-dimethyl-D-homo-C-nor-5α,13α-gonan-3-one for the 17α-ethynyl-17β-hydroxy-10,17aβ-dimethyl-D-homo-C-nor-5α,13α-gonan-3-one called for in example 7C affords, by a procedure identical with that described therein except that the product is isolated from an eluate comprising 5 percent ethyl acetate in benzene and is recrystallized from a mixture of acetone and hexane, 17β-acetoxy-10, 17aβ-dimethyl-D-homo-C-nor-13α-gona-1,4-dien-3-one melting at 135–137°. The product has the formula

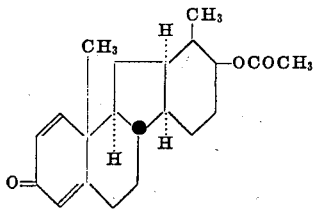

EXAMPLE 9

17β-Hydroxy-10,17aβ-dimethyl-D-homo-C-nor-13α-gona-1,4-dien-3-one. A solution of 85 parts of 17β-acetoxy-10,17 aβ-dimethyl-D-homo-C-nor-13α-gona-1,4-dien-3-one in 4000 parts of methanol and 1090 parts of aqueous 10 percent potassium hydroxide is heated at the boiling point under reflux for 2 hours, whereupon methanol is removed by vacuum distillation and the residue diluted with an equal volume of water. The resultant mixture is extracted with dichloromethane. The extract, stripped of solvent by vacuum distillation, affords 17β-hydroxy-10,17aβ-dimethyl-D-homo-C-nor-13α-gona-1,4-dien-3-one as the residue which, recrystallized from a mixture of ether and hexane, melts at 125–127°. The product has the formula

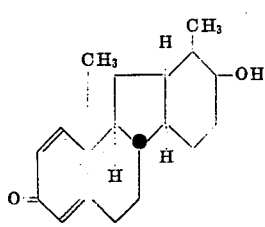

EXAMPLE 10

17β-Acetoxy-10,17aβ-dimethyl-D-homo-C-nor-13α-gon-4-en-3-one. To a mixture of 630 parts of liquid ammonia at −70° containing 3 parts of lithium is added 9 parts of 17β-acetoxy-10,17aβ-dimethyl-D-homo-C-nor-13α-gona-1,4-dien-3-one in approximately 180 parts of tetrahydrofuran. Approximately 200 parts of ammonium chloride is introduced a moment later, whereupon the reaction mixture is allowed to stand (briefly) until the color disappears. Ammonia is then removed by distillation and the residue diluted with an equal volume of water. The resultant mixture is extracted with dichloromethane. The extract is washed with water, dried over anhydrous sodium sulfate, and thereupon stripped of solvent by vacuum distillation. The residue is taken up in ether, and the ether solution is dried over anhydrous sodium sulfate in the presence of decolorizing charcoal. Upon evaporation of the solvent, 17β-acetoxy-10,17aβ-dimethyl-D-homo-C-nor-13α-gon-4-en-3-one is obtained as the residue. The product has the formula

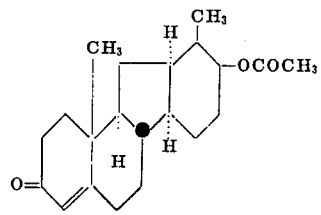

Example 11

17β-Acetoxy-10,17aβ-dimethyl-D-homo-C-nor-13α-gona-4,6-dien-3-one. To 60 parts of 17β-acetoxy-10,17aβ-dimethyl-D-homo-C-nor-13α-gon-4-en-3-one in 78 parts of tert-butyl alcohol is added 100 parts of chloranil. The resultant mixture is stirred at the boiling point under reflux in a nitrogen atmosphere for approximately 5 hours, then cooled to room temperature and diluted with 5 volumes of water. The mixture thus obtained is extracted with dichloromethane. The extract is washed successively with aqueous 5 percent potassium hydroxide and water, whereupon solvent is removed by vacuum distillation and the residue chromatographed on silica gel, using benzene and ethyl acetate as developing solvents. From an eluate comprising 5 percent ethyl acetate in benzene, on evaporation of solvent, 17β-acetoxy-10,17aβ-dimethyl-D-homo-C-nor-13α-gona-4,6-dien-3-one is obtained as the residue. The product is amorphous. It has the formula

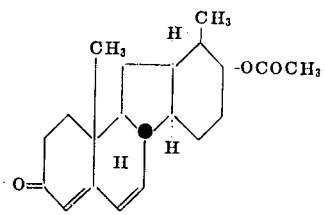

EXAMPLE 12

17β-Hydroxy-10,17aβ-dimethyl-D-homo-C-nor-13α-gona-4,6-dien-3-one. A solution of 85 parts of 17β-acetoxy-10,17 aβ-dimethyl-D-homo-C-nor-13α-gona-4,6-dien-3-one in 4000 parts of methanol and 1090 parts of aqueous 10 percent potassium hydroxide is heated at the boiling point under reflux for 2 hours, whereupon methanol is removed by vacuum distillation and the residue diluted with an equal volume of water. The resultant mixture is extracted with dichloromethane. The extract is stripped of solvent by vacuum distillation, affording 17β-hydroxyn10,17aβ-dimethyl-D-homo-C-nor-13αgona-4,6-dien-3-one as the hemihydrate which, recrystallized from aqueous acetone, melts at 164–167°. Water of crystallization is removed by heating in vacuo. The anhydrous product has the formula

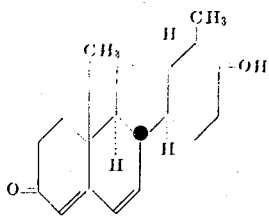

EXAMPLE 13

10,17aβ-Dimethyl-D-homo-C-nor-13αgona-4,6-diene-3,17-dione. To a mixture of 146 parts of 17β-hydroxy-10,17 aβ-dimethyl-D-homo-C-nor-13α-gona-4,6-dien-3-one and 790 parts of acetone is slowly added 52 parts of chromium trioxide in a mixture of 85 parts of concentrated sulfuric acid with 150 parts of water. The resultant mixture is stirred at ambient temperatures for approximately 20 minutes, whereupon it is diluted with 320 parts of 2-propanol. The mixture thus obtained is extracted with dichloromethane. The extract is consecutively washed with water and aqueous 1 percent potassium bicarbonate, then stripped of solvent by vacuum distillation. Recrystallization of the residue from aqueous acetone affords 10,17aβ-dimethyl-D-homo-C-nor-13α-gona-4,6-diene-3,17-dione as the hemihydrate melting at 180–183°. Water of crystallization is removed by heating in vacuo. The anhydrous product has the formula

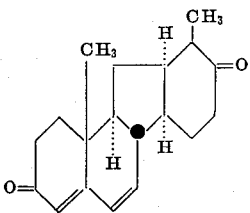

EXAMPLE 14

17β-Hydroxy-10,17aβ-dimethyl-D-homo-C-nor-13α-gon-4-en-3-one. Substitution of 85 parts of 17β-acetoxy-10,17aβ-dimethyl-D-homo-C-nor-13α-gon-4-en-3-one for the 17β-acetoxy-10,17aβ-dimethyl-D-homo-C-nor-13α-gona-1,4-dien-3-one called for in example 9 affords, by the procedure there detailed, 17β-hydroxy-10,17aβ-dimethyl-D-homo-C-nor-13α-gon-4-en-3-one melting at 154–157°. The product has the formula

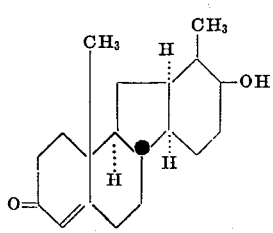

EXAMPLE 15

10,17aβ-Dimethyl-D-homo-C-nor-13α-gon-4-ene-3,17-dione. To a mixture of 146 parts of 17β-hydroxy-10,17aβ-dimethyl-D-homo-C-nor-13α-gona-4,6-dien-3-one and 790 parts of acetone is slowly added 52 parts of chromium trioxide in a mixture of 85 parts of concentrated sulfuric acid with 150 parts of water. The resultant mixture is stirred at ambient temperatures for approximately 20 minutes, whereupon it is diluted with 320 parts of 2-propanol. The mixture thus obtained is extracted with dichloromethane. The extract is consecutively washed with water and aqueous 1 percent potassium bicarbonate, then stripped of solvent by vacuum distillation. Recrystallization of the residue from a mixture of dichloromethane and cyclohexane affords 10,17aβ-dimethyl-D-homo-C-nor-13α-gon-4-ene-3,17-dione melting at 165–168°The product has the formula

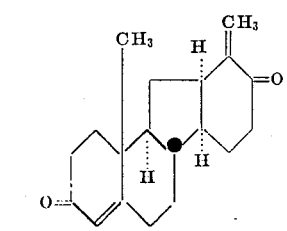

EXAMPLE 16

A. To 19 parts of "22a,5α-C-nor-D-homo-18 nor-spirostan-3β-ol-17a-one" [J. Amer. Chem. Soc., 76, 4013 (1954)] in 55 parts of ethylene glycol is added 50 parts of potassium hydroxide and 50 parts of hydrazine hydrate. The resultant mixture is stirred and heated at the boiling point in a current of nitrogen until, after 1½ hours, the temperature reaches 190°, where it is maintained by appropriate heating during continued stirring for 3 hours. The resultant solution is cooled and then precipitated by addition of water. The precipitate is filtered out, washed with water, dried in air, and thereupon chromatographed on silica gel, using benzene and ethyl acetate as developing solvents. From an eluate comprising 10 percent ethyl acetate in benzene, on evaporation of solvent and recrystallization of the residue from ethyl acetate, a product melting at 174–177° is obtained.

B. 3β-Hydroxy-10-methyl-D-homo-C-nor-5α, 13α-gon-16-en-17-yl methyl ketone. A mixture of 134 parts of the product of the foregoing example 16A, 80 parts of acetic acid, and 95 parts of octanoic acid is heated to 240° during 15 minutes, and thereafter at 240–250° for 20 minutes, while volatile components are allowed to distill. The resultant mixture is cooled and then successively diluted with 350 parts of ether, 200 parts of water, and excess aqueous 10 percent potassium hydroxide. The mixture thus obtained is stirred vigorously at room temperatures for 20 minutes, whereupon the nonaqueous phase is separated and consecutively washed with water, aqueous 5 potassium hydroxide, and water, then stripped of solvent by vacuum distillation.

To 167 parts of the residue in a mixture of 1000 parts of acetic acid with 1260 parts of 1,2-dichloroethane at −5° is added, during 20 minutes, a solution of 90 parts of chromium trioxide in 800 parts of aqueous 90 percent acetic acid. The resultant mixture is stirred for 1 hour at 0°, then diluted with a solution of 100 parts of sodium bisulfite in 400 parts of water, and thereafter with 1000 parts of water. The mixture thus obtained is extracted with ether. The ether extract is washed with water and stripped of solvent by vacuum distillation, keeping the temperature below 60°. The residue is taken up in ether, and the ether solution is filtered. The filtrate is washed with aqueous 1 percent potassium bicarbonate, dried over magnesium sulfate, and stripped of solvent by vacuum distillation.

A mixture of 174 parts of the residue, 600 parts of aqueous 20 percent potassium hydroxide, and 1040 parts of tert-butyl alcohol is stirred at the boiling point under reflux in a nitrogen atmosphere for 90 minutes, whereupon the alcohol is distilled off and the residue diluted with 5 volumes of water. The resultant mixture is extracted with ether. The ether extract is washed with water, dried over magnesium sulfate, and stripped of solvent by vacuum distillation. The residue is chromatographed on silica gel, using benzene and ethyl acetate as developing solvents. From an eluate comprising 10 percent ethyl acetate in benzene, on evaporation of solvent and recrystallization of the residue from a mixture of acetone and hexane, 3β-hydroxy-10-methyl-D-homo-C-nor-5α,13α-gon-16-en-17-yl methyl ketone melting at 144–146° is obtained.

C. 3β-Acetoxy-10-methyl-D-homo-C-nor-5α,13α-gon-16-en-17-yl methyl ketone. A mixture of 1 part of 3β-hydroxy-10-methyl-D-homo-C-nor-5α,13α-gon-16en-17-yl methyl ketone, 200 parts of pyridine, and 100 parts of acetic anhydride is allowed to stand at room temperatures overnight, then diluted with 5 volumes of water. The resultant mixture is extracted with dichloromethane. The extract is washed with aqueous 5 percent potassium hydroxide, dried over magnesium sulfate, and stripped of solvent by vacuum distillation. The amorphous residue is 3β-acetoxy-10-methyl-D-homo-C-nor-5α,13α-gon-16-en-17-yl methyl ketone.

D. 3β-Acetoxy-10-methyl-D-homo-C-nor-5α,13α-gonan-17β-yl methyl ketone oxime. A solution of 15 parts of 3β-acetoxy-10-methyl-D-homo-C-nor-5α,13α-gon-16-en-17-yl methyl ketone and 16 parts of hydroxylamine hydrochloride in 400 parts of pyridine is allowed to stand at room temperatures overnight. Upon dilution with 5 volumes of water, a precipitate is thrown down. The precipitate is filtered off, washed with water, dried in air, and recrystallized from aqueous acetone to give 3β-acetoxy-10-methyl-D-homo-C-nor-5α,13α-gonan-17β-yl methyl ketone oxime melting at 156–159°

E. 3β-Hydroxy-10-methyl-D-homo-C-nor-5α,13α-gonan-17-one. To a stirred solution of 6 parts of 3β-acetoxy-10-methyl-D-homo-C-nor-5α,13α-gonan-17β-yl methyl ketone oxime in 100 parts of pyridine at −5° is added, during 15 minutes, a cold solution of 17 parts of phosphorus oxychloride in 100 parts of pyridine. The resultant mixture is maintained at −5° for 2 hours, then slowly poured into 5 volumes of cold water. The mixture thus obtained is stirred vigorously for 25 minutes, then extracted with dichloromethane. The dichloromethane extract is washed with aqueous 2 percent potassium hydroxide and stripped of solvent by vacuum distillation.

A solution of 3 parts of the residue in 400 parts of methanol and 12 parts of concentrated hydrochloric acid is heated at the boiling point under reflux for 2 hours. Methanol is thereupon removed by vacuum distillation, and the residue is diluted with 5 volumes of water. The precipitate which forms is filtered off, washed with water, dried in air, and recrystallized from aqueous acetone to give 3β-hydroxy-10-methyl-D-homo-C-nor-5α,13α-gonan-17-one melting at 86–88°.

F. 10-Methyl-3β-(tetrahydropyran-2-yloxy)-D-homo-C-nor-5α,13α-gonan-17-one. A solution of 180 parts of 3β-hydroxy-10-methyl-D-homo-C-nor-5α,13α-gonan-17-one in 1760 parts of benzene, 5 parts of toluenesulfonic acid, and 184 parts of dihydropyran is allowed to stand at room temperature for 1 hour, then successively diluted with 20 parts of pyridine and 5 volumes of water. The resultant mixture is extracted with benzene. The benzene extract is washed with water and stripped of solvent by vacuum distillation. The residue is 10-methyl-3β-(tetrahydropyran-2-yloxy)-D-homo-C-nor-5α,13α-gonan-17-one.

G. 10-Methyl-3β-(tetrahydropyran-2-yloxy)-D-homo-C-nor-5α,13α-gonan-17βol. To a stirred mixture of 640 parts of tert-butyl alcohol and 1120 parts of liquid ammonia is added a solution of 20 parts of 10-methyl-3β-(tetrahydropyran-2-yloxy)-D-homo-C-nor-5α,13α-gonan-17-one in 720 parts of tetrahydrofuran, followed by 6 parts of lithium wire. Stirring is continued for 2 hours, whereupon the ammonia is distilled and the residue diluted with 5 volumes of water. The resultant mixture is extracted with benzene. The benzene extract is washed with water and stripped of solvent by vacuum distillation to give 10-methyl-3β-(tetrahydropyran-2-yloxy)-D-homo-C-nor-5α,13α-gonan-17β-ol.

H. 17β-Benzoyloxy-10-methyl-D-homo-C-nor-5α,13α-gonan-3β-01. A solution of 20 parts of 10methyl-3β-(tetrahydropyran-2-yloxy-D-homo-C-nor-5α,13α-gonan-17β-ol in 200 parts of pyridine is heated at 90° for 30 minutes with 24 parts of benzoyl chloride. The resultant mixture is cooled and then diluted with 30 parts of water. The mixture thus obtained is heated at 90° for 30 minutes, then consecutively diluted with 100 parts of water, 1600 parts of methanol, and excess hydrochloric acid. This mixture, in turn, is stirred at room temperatures for 2 hours, neutralized with potassium hydroxide, and concentrated to one-half volume by vacuum distillation. The concentrate is extracted with dichloromethane. The dichloromethane extract is washed with aqueous 2 percent potassium hydroxide and stripped of solvent by vacuum distillation. The residue is 17β-benzoyloxy-10-methyl-D-homo-C-nor-5α,13α-gonan-3β-ol.

I. 17β-Benzoyloxy-10-methyl-D-homo-C-nor-5α,13α-gonan-3-one. To a mixture of 146 parts of 17β-benzoyloxy-10-methyl-3β-(tetrahydropyran-2-yloxy)-D-homo-C-nor-5α,13α-gonane and 790 parts of acetone is slowly added 52 parts of chromium trioxide in a mixture of 85 parts of concentrated sulfuric acid with 150 parts of water. The resultant mixture is stirred at ambient temperatures for approximately 20 minutes, whereupon it is diluted with 320 parts of 2-propanol. The mixture thus obtained is extracted with dichloromethane. The dichloromethane extract is washed with water and stripped of solvent by vacuum distillation. The residue is chromatographed on silica gel, using benzene and ethyl acetate as developing solvents. From an eluate comprising 1 percent ethyl acetate in benzene, on evaporation of solvent, amorphous 17β-benzoyloxy-10-methyl-D-homo-C-nor-5α,13α-gonan-3-one is obtained.

J. 17β-Benzoyloxy-10-methyl-D-homo-C-nor-13α-gona-1,4-dien-3-one. A mixture of 33 parts of 17β-benzoyloxy-10-methyl-D-homo-C-nor-5α,13α-gonan-3-one and 20 parts of selenium dioxide in a mixture of 1200 parts of tert-butyl alcohol and 10 parts of pyridine is heated at the boiling point under reflux in a nitrogen atmosphere for 65 hours. The red precipitate which forms is filtered off and washed with ethyl acetate. Filtrate and wash are combined and concentrated to dryness by vacuum distillation. The residue is taken up in ethyl acetate. The ethyl acetate solution is consecutively washed with water, aqueous 10 potassium bicarbonate, water, ice-cold 10 percent ammonium sulfide, ice-cold 10 percent ammonium hydroxide, water, dilute 5 percent hydrochloric acid, water, and aqueous 1 percent potassium bicarbonate. Solvent is then removed by vacuum distillation, and the residue is chromatographed on silica gel, using benzene and ethyl acetate as developing solvents. From an eluate comprising 5 percent ethyl acetate in benzene, on evaporation of solvent, 17β-benzoyloxy-10-methyl-D-homo-C-nor-13α-gona-1,4-dien-3-one is obtained as the residue. The product has the formula

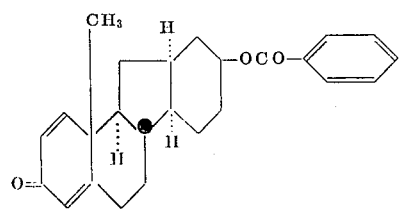

EXAMPLE 17

17β-Hydroxy-10-methyl-D-homo-C-nor-13α-gona-1,4-dien-3-one. A solution of 85 parts of 17β-benzoyloxy-10-methyl-D-homo-C-nor-13α-gona-1,4-dien-3-one in 4000 parts of methanol and 1090 parts of aqueous 10 percent potassium hydroxide is heated at the boiling point under reflux for 2 hours, whereupon methanol is removed by vacuum distillation and the residue diluted with an equal volume of water. The resultant mixture is extracted with dichloromethane. The extract, stripped of solvent by vacuum distillation, affords 17β-hydroxy-10-methyl-D-homo-C-nor-13α-gona-1,4-diene-3-one as the residue. The product has the formula

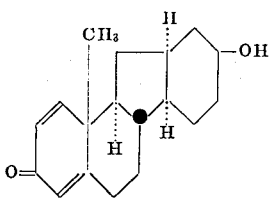

EXAMPLE 18

10-Methyl-D-homo-C-nor-13α-gona-1,4-diene-3,17-dione. To a mixture of 146 parts of 17β-hydroxy-10-methyl-D-homo-C-nor-13αgona-1,4-dien-3-one and 790 parts of acetone is slowly added 52 parts of chromium trioxide in a mixture of 85 parts of concentrated sulfuric acid with 150 parts of water. The resultant mixture is stirred at room temperature for approximately one-half hour, whereupon it is diluted with 400 parts of 2-propanol. The resultant mixture is extracted with dichloromethane. The extract is consecutively washed with water and aqueous 1 percent potassium bicarbonate, then stripped of solvent by vacuum distillation. The residue is 10-methyl-D-homo-C-nor-13α-gona-1,4-diene-3,17-dione, having the formula

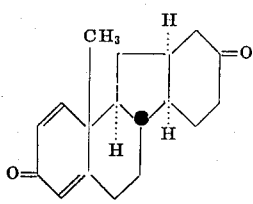

EXAMPLE 19

A. 17β-Benzoyloxy-2α,4α-dibromo-10-methyl-D-homo-C-nor-5α,13α-gonan-3-one. To a solution of 96 parts of 17β-benzoyloxy-10-methyl-D-homo-C-nor-5α,13α-gonan-3-one in 5000 parts of acetic acid and 50 parts of a 30 percent solution of hydrogen bromide in acetic acid at 15° is added, during 5 minutes, a solution of 80 parts of bromine in 200 parts of acetic acid. The resultant mixture is allowed to stand at ambient temperatures for 2 hours, whereupon the precipitate which forms is filtered off, washed with water, dried in air, and recrystallized from a mixture of dichloromethane and methanol to give 17β-benzoyloxy-2α,4α-dibromo-10-methyl-D-homo-C-nor-5α,13α-gonan-3-one.

B. 17β-Benzoyloxy-10-methyl-D-homo-C-nor-13α-gon-4-en-3-one. To 260 parts of acetone maintained at around 20° is added 34 parts of bromine. The resultant mixture is stirred until decolorized, at which point 100 parts of potassium carbonate and 160 parts of acetone are introduced and stirring resumed for a further 30 minutes. Insoluble solids are filtered out and washed with acetone. To the combined filtrate and wash are added 1740 parts of sodium iodide and 1120 parts of acetone. The mixture thus obtained is heated at the boiling point under reflux in an atmosphere of nitrogen for 15 minutes, whereupon 31 parts of 17β-benzoyloxy-2α,4α-dibromo-10-methyl-D-homo-C-nor-5α,13α-gonan-3-one is introduced. The resultant mixture is heated at the boiling point under reflux in a nitrogen atmosphere for 2½ hours, at which point 30 parts of oxalic acid is added and boiling under reflux in nitrogen resumed for a further 1 hour. The mixture is then diluted with ethyl acetate and filtered. The filtrate is consecutively washed with aqueous 1 percent potassium bicarbonate and water, and dried over magnesium sulfate. A mixture of 100 parts of acetic acid with 200 parts of zinc dust is added, and the resultant mixture is stirred for a total of 20 minutes during which decolorization occurs. The mixture is then filtered; and the filtrate is washed successively with water, aqueous 5 percent potassium hydroxide, and water, then stripped of solvent by vacuum distillation. The amorphous residue is 17β-benzoyloxy-10-methyl-D-homo-C-nor-31α-gon-4-en-3-one, having the formula

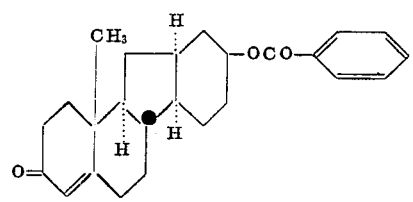

EXAMPLE 20

17β-Hydroxy-10-methyl-D-homo-C-nor-13α-gon-4-en-3-one. A solution of 85 parts of 17β-benzoyloxy-10-methyl-D-homo-C-nor-13α-gon-4-en-3-one in 4000 parts of methanol and 1090 parts of aqueous 10 percent potassium hydroxide is heated at the boiling point under reflux for 2 hours, whereupon methanol is removed by vacuum distillation and the residue diluted with an equal volume of water. The resultant mixture is extracted with dichloromethane. The extract is washed with water, dried over magnesium sulfate, and stripped of solvent by vacuum distillation, affording 17β-hydroxy-10-methyl-D-homo-C-nor-13α-gon-4-en-3-one as the residue which, recrystallized from a mixture of acetone and hexane, melts at 114–116°. The product has the formula

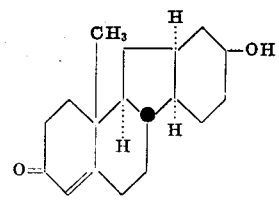

EXAMPLE 21

17β-Hydroxy-10methyl-D-homo-C-nor-13α-gon-4-ene-3,17-dione. To a mixture of 146 parts of 17β-hydroxy-10-methyl-D-homo-C-nor-13α-gon-4-en-3-one and 790 parts of acetone is slowly added 52 parts of chromium trioxide in a mixture of 85 parts of concentrated sulfuric acid with 150 parts of water. The resultant mixture is stirred at room temperatures for approximately 20 minutes, whereupon it is diluted with 32 parts of 2-propanol. The mixture thus obtained is extracted with dichloromethane. The extract is consecutively washed with water and aqueous potassium bicarbonate, then stripped of solvent by vacuum distillation, affording a residue which, recrystallized from a mixture of acetone and hexane, melts at 134–136°. The product thus obtained is 17β-hydroxy-10 methyl-D-homo-C-nor-13αgon-4-ene-3,17-dione tetartoacetonate, from which solvent of crystallization is removed by heating in vacuo. The nonsolvated product has the formula

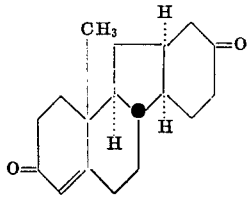

EXAMPLE 22

10-Methyl-D-homo-C-nor-13α-gona-4,6-diene-3,17-dione.
To 60 parts of 17β-hydroxy-10-methyl-D-homo-C-nor-13α-gon-4-ene-3,17-dione in 78 parts of tert-butyl alcohol is added 100 parts of chloranil. The resultant mixture is heated, with stirring, at the boiling point under reflux in a nitrogen atmosphere for 5 hours. It is thereupon cooled to room temperature and diluted with water. The mixture thus obtained is extracted with dichloromethane. The extract is washed successively with aqueous 5 potassium hydroxide and water, then stripped of solvent by vacuum distillation. The residue is chromatographed on silica gel, using benzene and ethyl acetate as developing solvents. From an eluate comprising 5 percent ethyl acetate in benzene, on evaporation of solvent, 10-methyl-D-homo-C-nor-13α-gona-4,6-diene-3,17-dione is obtained. The product has the formula

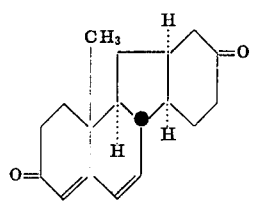

What is claimed is:
1. A compound of the formula

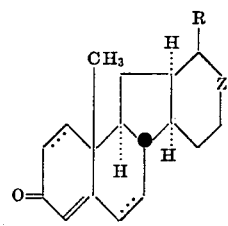

wherein the endocyclic dotted lines indicate that the compounds are exclusively $\Delta^4$, $\Delta^{1,4}$, or $\Delta^{4,6}$; R represents hydrogen or methyl; and Z represents carbonyl or radical of the formula

in which R' represents hydrogen, lower alkanoyl, or benzoyl and R" represents hydrogen, lower alkyl, or ethynyl.

2. A compound according to claim 1 having the formula

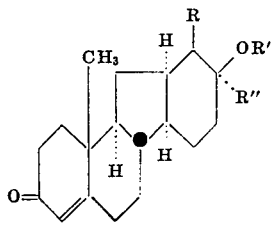

wherein R represents hydrogen or methyl; R' represents hydrogen, lower alkanoyl, or benzoyl; and R" represents hydrogen or methyl.

3. A compound according to claim 1 having the formula

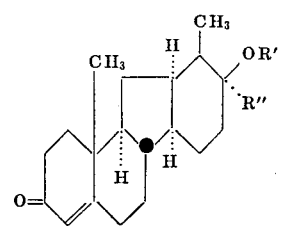

wherein R' represents hydrogen, lower alkanoyl, or benzoyl and R" represents hydrogen or methyl 4. A compound according to claim 1 which is 17β-hydroxy-10,17aβ-dimethyl-D-homo-C-nor-13α-gon-4-en-3-one.

5. A compound according to claim 1 which is 17β-hydroxy-10,17α,17aβ-trimethyl-D-homo-C-nor-13α-gon-4-en3-one.

5. A compound according to claim 1 having the formula

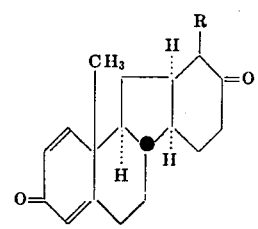

wherein R represents hydrogen or methyl.

7. A compound according to claim 1 which is 10,17aβ-dimethyl-D-homo-C-nor-13α-gona-1,4-diene-3,17-dione.

8. A compound according to claim 1 having the formula

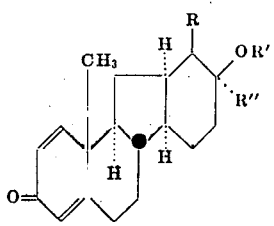

wherein R represents hydrogen or methyl; R' represents hydrogen, lower alkanoyl, or benzoyl; and R' represents hydrogen, lower alkyl, or ethynyl.

9. A compound according to claim 1 having the formula

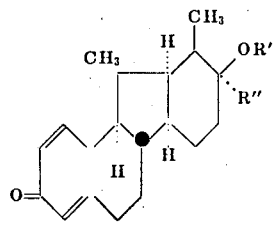

wherein R' represents hydrogen or lower alkanoyl and R" represents hydrogen or methyl.

10. A compound according to claim 1 which is 17β-hydroxy-10,17aβ-dimethyl-D-homo-C-nor-13αgona-1,4-dien-3-one.

11. A compound according to claim 1 in which is 17β-hydroxy-10,17α,17aβ-trimethyl-D-homo-C-nor-13α-gona-1,4-dien-3-one.

12. A compound according to claim 1 having the formula

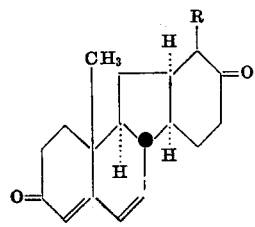

wherein R represents hydrogen or methyl.

13. A compound according to claim 1 which is 10,17aβ-dimethyl-D-homo-C-nor-13α-gon-4-ene-3,17-dione.

14. A compound according to claim 1 which is 17β-hydroxy-10-methyl-D-homo-C-nor-13α-gon-4-ene-3,17-dione.

15. A compound according to claim 1 having the formula

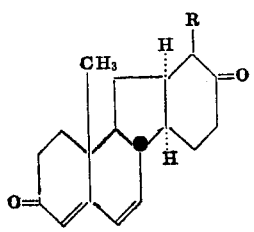

wherein R represents hydrogen or methyl.

16. A compound according to claim 1 which is 10,17aβ-dimethyl-D-homo-C-nor-13α-gona-4,6-diene-3,17-dione.

17. A compound according to claim 1 having the formula

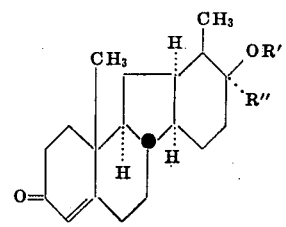

wherein R' represents hydrogen or lower alkanoyl and R'' represents hydrogen or methyl.

18. A compound according to claim 1 which is 17β-hydroxy-10,17aβ-dimethyl-D-homo-C-nor-13α-gona-4,6-dien-3-one.

* * * * *

UNITED STATES PATENT OFFICE
CERTIFICATE OF CORRECTION

Patent No. 3,622,631                    Dated November 23, 1971

Inventor(s)   William F. Johns

It is certified that error appears in the above-identified patent and that said Letters Patent are hereby corrected as shown below:

Cover page, line 1 of title and column 1, line 1, "10,17αβ" should be -- 10,17aβ --.

Abstract, line 1, "10,17αβ" should be -- 10,17aβ --.

Column 1, line 55, "-alkyl" should be -- -CO-lower alkyl --.

Column 1, line 59, "17α beta/nor" should be --17a beta/nor --.

Column 1, line 70, "does" should be -- dose --.

Column 2, lines 24, 26 & 28, insert an "*" after "one", "dione", and "one", respectively.

Column 2, formula,

" 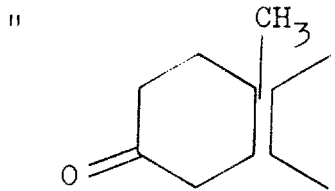  "   should be --   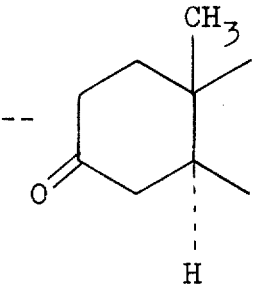   --.

Column 3, line 12, "C-nor 5α,13α-" should be -- C-nor-5α,13α --.

Column 5, line 38, "-gonnan-" should be -- -gonan- --.

UNITED STATES PATENT OFFICE
CERTIFICATE OF CORRECTION

Patent No. 3,622,631　　　　　　　　　Dated November 23, 1971

Inventor(s)　William F. Johns

It is certified that error appears in the above-identified patent and that said Letters Patent are hereby corrected as shown below:

Column 5, line 41, "-acetoxy-10,17aβ-" should be -- -acetoxy-10,17α,17aβ- --.

Colmun 5, line 49, " 5 percent potassium" should be -- 5 percent hydrochloric acid, water, and aqueous 1 percent potassium --.

Column 5, line 56, "α,17aβ13α-gona-" should be --α,17aβ-trimethyl-D-homo-C-nor-13α-gona- --.

Column 5, line 57, after "obtained." insert -- The product has the formula --.

Column 6, line 54, delete "The product".

Column 6, line 62, "α,17aβtrimethyl-" should be --α,17aβ-trimethyl- --.

Column 7, line 5, "17α,17a-trimethyl-" should be --17α,17aβ-trimethyl- --.

Column 7, line 6, "17β-trimethyl-D-homo-C-nor-13α,17aβ-" should be -- 17β-acetoxy-10,17α,17aβ- --.

Column 7, line 9, "α,17aβ13α-gon-" should be --α,17aβ-trimethyl-D-homo-C-nor-13α-gon- --.

Column 7, line 30, "α-17aβ13α-gon-" should be --α,17aβ-trimethyl-D-homo-C-nor-13α-gon- --.

Column 7, line 39, "as The resultant solvents." should be -- as developing solvents. --.

Column 8, line 11, "10,17a-" should be -- 10,17aβ- --.

UNITED STATES PATENT OFFICE
CERTIFICATE OF CORRECTION

Patent No. 3,622,631　　　　　　　　　Dated　　November 23, 1971

Inventor(s)　　William F. Johns

It is certified that error appears in the above-identified patent and that said Letters Patent are hereby corrected as shown below:

Column 8, formula

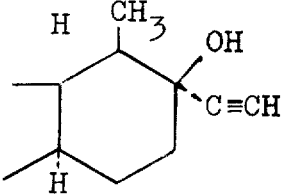 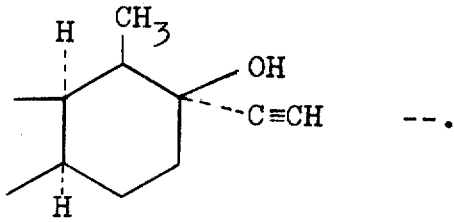

Column 8, line 64, "-gonane" should be -- -gonane.--

Column 8, line 68, "parts f calcium" should be -- parts of calcium --.

Column 9, line 8, "91-93°<." should be -- 91-93°. --.

Column 9, lines 10-11, "acetoxy-,-17aβ" should be --acetoxy-10,17aβ --.

Column 9, line 14, "3000parts" should be -- 3000 parts --.

Column 11, line 2, "17β-hydroxyn10,17aβ-" should be --17β-hydroxy-10,17aβ- --.

Column 11, line 2, "13αgona" should be -- 13α-gona --.

Column 11, line 23, "13αgona" should be -- 13α-gona --.

Column 12, line 5, "13α-gona-4,6-dien-3-one" should be -- 13α-gon-4-en-3-one --.

Column 12, line 60, "5" should be -- 5% --.

Column 13, line 18, "16en" should be -- 16-en --.

Column 14, line 9, "10methyl" should be -- 10-methyl --.

UNITED STATES PATENT OFFICE
CERTIFICATE OF CORRECTION

Patent No. 3,622,631          Dated November 23, 1971

Inventor(s) William F. Johns

It is certified that error appears in the above-identified patent and that said Letters Patent are hereby corrected as shown below:

Column 14, line 53, "10 potassium" should be -- 10 percent potassium --.

Column 15, line 30, "13αgona" should be -- 13α-gona --.

Column 16, line 19, "-31α-" should be -- -13α- --.

Column 16, line 75, "-10 methyl" should be -- -10-methyl --.

Column 16, line 75, "-13αgon-" should be -- -13α-gon- --.

Column 17, line 24, "5 potassium" should be -- 5 percent potassium --.

Column 17, line 56, "or radical" should be -- or a radical --.

Column 18, line 23, "4-en3-one" should be -- 4-en-3-one --.

Column 18, line 24, "5." should be --6.--.

Column 18, line 57, "R'" should be -- R" --.

Column 19, line 2, "13αgona" should be -- 13α-gona --.

Column 19, line 3, "1 in which is" should be -- 1 which is --.

Signed and sealed this 8th day of May 1973.

(SEAL)
Attest:

EDWARD M. FLETCHER, JR.          ROBERT GOTTSCHALK
Attesting Officer          Commissioner of Patents